(12) United States Patent
Boeke

(10) Patent No.: US 8,279,637 B2
(45) Date of Patent: Oct. 2, 2012

(54) GENERATING DRIVE SIGNALS FOR A SYNCHRONOUS RECTIFICATION SWITCH OF A FLYBACK CONVERTER

(75) Inventor: Ulrich Boeke, Langerwehe (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 835 days.

(21) Appl. No.: 12/302,032

(22) PCT Filed: May 25, 2007

(86) PCT No.: PCT/IB2007/051980
§ 371 (c)(1),
(2), (4) Date: Nov. 24, 2008

(87) PCT Pub. No.: WO2007/138537
PCT Pub. Date: Dec. 6, 2007

(65) Prior Publication Data
US 2009/0207637 A1   Aug. 20, 2009

(30) Foreign Application Priority Data
May 29, 2006   (EP) .................................... 06114605

(51) Int. Cl.
H02M 3/335   (2006.01)
H02M 7/537   (2006.01)
(52) U.S. Cl. .................. 363/21.12; 363/17; 363/21.06; 363/21.14; 363/24; 363/25; 363/98; 363/131; 363/132; 363/133; 363/134
(58) Field of Classification Search .............. 363/17, 363/21.06, 21.12, 21.14, 24, 25, 98, 131, 363/132, 133, 134
See application file for complete search history.

(56) References Cited

U.S. PATENT DOCUMENTS

| 5,057,986 A |   | 10/1991 | Henze et al. |
| 5,402,329 A |   | 3/1995 | Wittenbreder, Jr. |
| 5,734,563 A | * | 3/1998 | Shinada .................... 363/21.06 |

(Continued)

FOREIGN PATENT DOCUMENTS

| EP | 1148624 A1 | 10/2001 |
| JP | 2005198438 A | 7/2005 |

OTHER PUBLICATIONS

Jitaru I D Ed—Institute of Electrical and Electronics Engineers: "High efficiency flyback converter using synchronous rectification" APEC 2002. 17TH. Annual IEEE Applied Power Electronics Conference and Exposition. Dallas, TX, Mar. 14, 2002, vol. 2 of 2. Conf. 17, pp. 867-871, XP010583019 ISBN: 0-7803-7404-5.

(Continued)

*Primary Examiner* — Bao Q Vu
(74) *Attorney, Agent, or Firm* — Mark L. Beloborodov

(57) ABSTRACT

In order to further develop a circuit arrangement (100) as well as a method for generating at least one drive signal for at least one synchronous rectification switch of at least one flyback converter in such way that an improved and simpler thermal management can be combined with a significant cost reduction as well as with a higher efficiency, it is proposed to generate the drive signal for said synchronous rectification switch as a function of at least one oscillating signal controlling the synchronous rectification switch, of at least one constant delay time, of at least one variable delay time, and of at least one Boolean OR function.

9 Claims, 2 Drawing Sheets

U.S. PATENT DOCUMENTS

| | | | |
|---|---|---|---|
| 6,091,616 A * | 7/2000 | Jacobs et al. | 363/127 |
| 6,104,623 A * | 8/2000 | Rozman | 363/21.06 |
| 6,292,380 B2 * | 9/2001 | Diallo et al. | 363/89 |
| 6,462,965 B1 | 10/2002 | Uesono | |
| 6,563,719 B1 * | 5/2003 | Hua et al. | 363/21.06 |
| 6,674,658 B2 * | 1/2004 | Mao et al. | 363/127 |
| 6,888,728 B2 | 5/2005 | Takagi et al. | |
| 6,961,253 B1 | 11/2005 | Cohen | |
| 7,751,213 B2 * | 7/2010 | Toccaceli | 363/127 |
| 2003/0090914 A1 | 5/2003 | Jansen et al. | |
| 2004/0070994 A1 | 4/2004 | Takagi et al. | |
| 2004/0125621 A1 * | 7/2004 | Yang et al. | 363/21.14 |
| 2005/0207188 A1 * | 9/2005 | Takashima et al. | 363/21.14 |
| 2006/0018135 A1 * | 1/2006 | Yang et al. | 363/21.14 |

OTHER PUBLICATIONS

Gang Chen et al: "Actively Clamped Bidirectional Flyback Converter" IEEE Transactions on Industrial Electronics, IEEE Service Center, vol. 47, No. 4, Aug. 2000, XP011023690 ISSN: 0278-0046.

Boeke U et al: "Experimental Analysis of a Flyback Converter with Excellent Efficiency" Applied Power Electronics Conference and Exposition, 2006. APEC '06. Twenty-First Annual IEEE Mar. 19, 2006, pp. 1001-1007, XP010910066 ISBN: 0-7803-9547-6.

Fabrizio Librizzi, et al: STSRx Family: Mixed-signal ICs to Drive Synchronous Rectifiers in Isolated SMPSs, STMicroelectronics, application note AN1288, Jul. 2000.

* cited by examiner

GENERATING DRIVE SIGNALS FOR A SYNCHRONOUS RECTIFICATION SWITCH OF A FLYBACK CONVERTER

FIELD OF THE INVENTION

The present invention relates to a circuit arrangement for generating drive signals for a synchronous rectification switch of a flyback converter. The present invention further relates to a method for generating at least one drive signal for at least one synchronous rectification switch of at least one flyback converter, in particular at least one actively clamped bidirectional flyback converter.

BACKGROUND OF THE INVENTION

An actively clamped bidirectional flyback converter is disclosed in the article "Experimental Analysis Of A Flyback Converter With Excellent Efficiency" as presented by U. Boeke, D. Itzenga, K. Rigbers, and R. W. De Doncker in Proceedings of Applied Power Electronic Conference (APEC) from Mar. 19 to 23, 2006, in Dallas, Tex.

This actively clamped bidirectional flyback converter is based on the reference document "Actively-Clamped Bidirectional Flyback Converter" by Gang Chen, Yim-Shu Lee, S. Y. Ron Hui, Dehong Xu, Yousheng Wang, IEEE Transactions on Industrial Electronics, volume 47, number 4, August 2000, pages 770 to 779. This converter does not include any current sensors. The on-time of the synchronous rectifier switch is taken from the pulse-width-modulator in combination with a "turn-on delay" sub-circuit.

EP 1 148 624 A1 describes an integrated circuit to drive a power M[etal-]O[xide-]S[emiconductor]F[ield]E[ffect]T[ransistor] acting as synchronous rectifier (cf. also Fabrizio Librizzi, and Pietro Scalia, "STSRx family: Mixed-signal ICs to drive synchronous rectifiers in isolated SMPSs", STMicroelectronics, application note AN1288, July 2000).

U.S. Pat. No. 6,462,965 B1 discloses a sub-circuit to drive a power MOSFET as synchronous rectifier switch by means of one current transformer per output.

US 2003/0090914 A1 reveals a circuit including a special sub-circuit to drive a power MOSFET as synchronous rectifier by means of a second current shunt sensor.

Texas Instruments' integrated control circuit type UCC2891 and UCC2897 includes only two time delay functions to control the on-time of the two power semiconductors on the primary converter side (cf. Texas Instruments, UCC2891 Current Mode Active Clamp PWM Controller, data sheet, July 2004; Texas Instruments, UCC2897, Current Mode Active Clamp PWM Controller, data sheet, April 2005). The use of synchronous rectifier switches is only illustrated for the application of a forward converter and does not include control circuits for the timing of the synchronous rectifier switches.

The use of delayed turn on time signals to turn on both power semiconductors of a flyback converter with synchronous rectification is disclosed in the article "High efficiency flyback converter using synchronous rectification" by I. D. Jitaru, Proceedings of Applied Power Electronics Conference (APEC) from Mar. 10 to 14, 2002 in Dallas, Tex., pages 867 to 871. This converter does not use the active clamping principle. Thus, the two switches of this converter are explicitly never turned on at the same time.

U.S. Pat. No. 6,888,728 B2 includes timing circuits on the secondary side of the transformer. The timing circuits include a comparator requiring an additional supply voltage on the secondary side of the power converter. This overall effort of sub-circuits to drive the synchronous rectifier switches on the secondary side of the transformer is very high and generates significant costs. The greatest disadvantage of U.S. Pat. No. 6,888,728 B2 is the higher component effort meaning also higher cost.

JP 2005-198438 A describes a load resonant half-bridge converter with synchronous rectification. The component count of this known circuit is very high; apart from that, the load resonant converter includes a second power transformer plus a shunt resistor both generating additional power losses and thus increasing the thermal management effort. The greatest disadvantage of JP 2005-198438 A is the use of a second power transformer to monitor the input current of the load resonant circuit on the secondary side of transformer; this generates significant loss in the second power transformer.

Regarding the technological background of the present invention, reference can finally be made to U.S. Pat. No. 5,057,986 as well as U.S. Pat. No. 5,402,329.

SUMMARY OF THE INVENTION

It is, inter alia, an object of the invention to provide an improved generation of drive signals for a synchronous rectification switch of a flyback converter. The invention is defined by the independent claims. Advantageous embodiments are defined by the dependent claims.

Particular embodiments may result in an improved and simpler thermal management combined with a significant cost reduction as well as with a higher efficiency.

Advantageous embodiments of the present invention are principally based on the idea to control a synchronous rectifier, more particularly to provide a control circuit for at least one actively clamped bidirectional flyback converter with a synchronous rectifier and with a transformer isolation making use of an oscillating signal which controls the synchronous rectification switch.

According to a particular refinement of the present invention, at least part of the flyback converter can be turned-off with a variable delay time. The delay time interval is a function of the relative converter power level with minimum delay, which is independent of the power level.

In a preferred embodiment of the present invention, at least one voltage sensor can measure the drop across the low side switch on the primary side which gives a digital "high" output in case the sensed drain-source voltage of said low side switch is negative due to the fact that the current in said low side switch is flowing from source to drain.

Preferably, this digital output of the voltage sensor is ORed with at least one second signal to drive the synchronous rectifier switch. Said second signal is a delayed signal of at least one inverse P[ulse-]W[idth]M[odulation] signal.

Advantageous embodiments of the present invention have the advantage of a minimum effort to sense electrical signals.

A further advantage of certain embodiments of the present invention is that the cost of the circuit to drive the synchronous rectifier MOSFET can be significantly reduced; in addition thereto, also the power losses of the actively clamped bidirectional flyback converter with synchronous rectification can be reduced. The latter advantage can be used to reduce the effort for thermal management, i.e. to transfer the heat out of the preferably closed housing of the circuit arrangement of the present invention.

Apart from that, advantageous embodiments of the present invention
- enable an improved design freedom for flat displays, such as for L[iquid]C[rystal]D[isplay] T[ele]V[ision]s,
- enable compact L[ight-]E[mitting]D[iode] lamp drivers with low cooling effort, and
- improve the functionality of power conversion modules.

Embodiments of the present invention can be applied in order to improve electronic circuits in consumer products, such as in L[iquid]C[rystal]D[isplay] T[ele]V[ision]s or in L[iquid]C[rystal]D[isplay] computer monitors, in L[ight-]E[mitting]D[iode] lamp drivers, in battery chargers and in battery dischargers.

These and other aspects of the invention will be apparent from and elucidated with reference to the embodiments described hereinafter.

DESCRIPTION OF EMBODIMENTS

Figure 1:
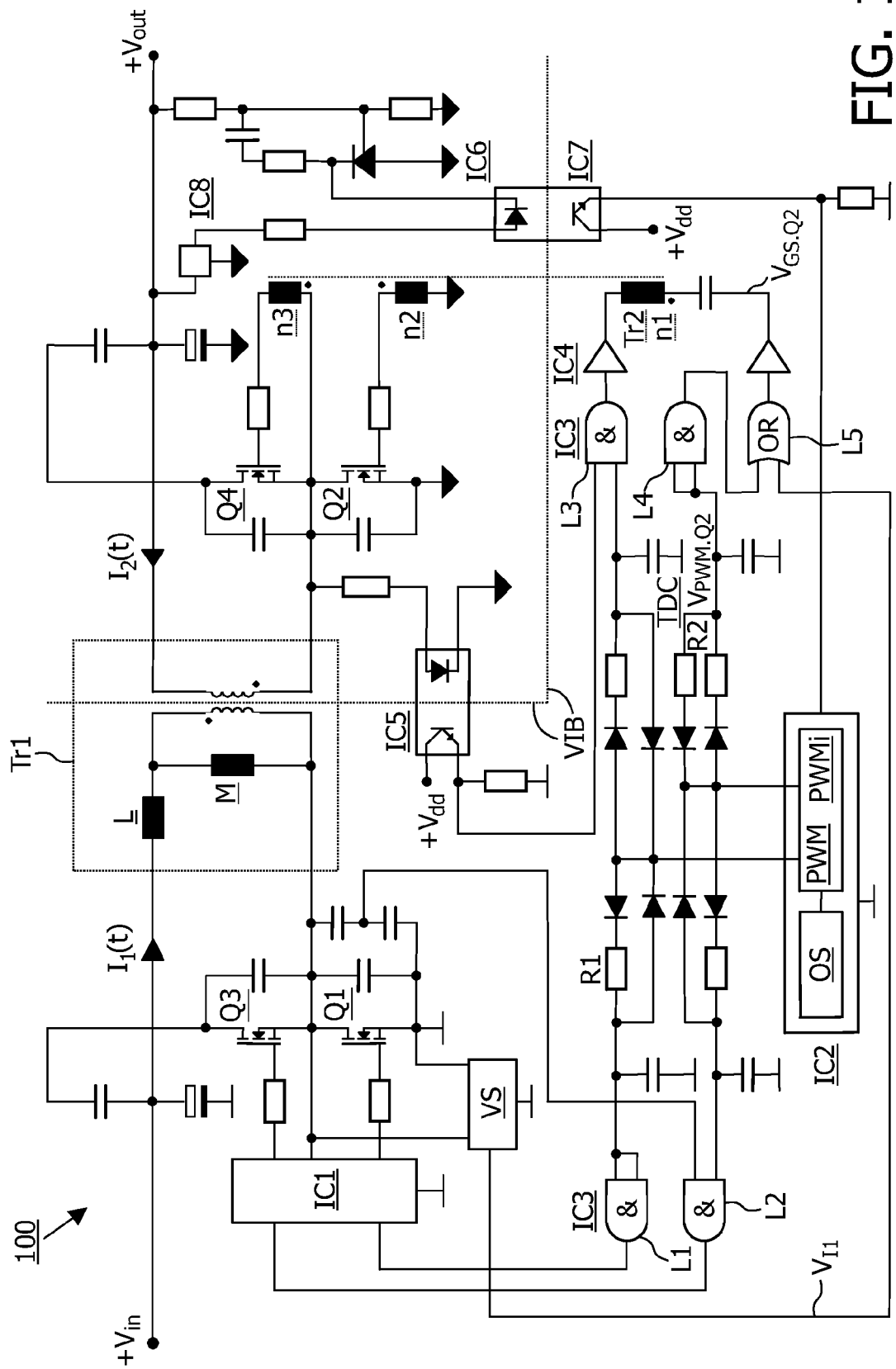
FIG. 1 schematically shows a principle diagram of a preferred embodiment of a circuit arrangement according to the present invention being operated according to the method of the present invention.

FIG. 1 shows a block diagram of a preferred embodiment of the circuit arrangement 100 according to the present invention. The circuit arrangement 100 comprises an actively clamped bidirectional flyback converter with four power semiconductors Q1, Q2, Q3, Q4; each of these power semiconductors Q1, Q2, Q3, Q4 is implemented as a transistor unit, in particular as a metal-oxide semiconductor (MOS) or as a metal-oxide semiconductor field effect transistor (MOSFET).

Two of these transistors, namely the first transistor Q1 and the third transistor Q3 are located on the primary side of a power transformer Tr1; the other two of these transistors, namely the second transistor Q2 and the fourth transistor Q4 are located on the secondary side of the power transformer Tr1. The second transistor Q2 acts as synchronous rectifier; the fourth transistor Q4 is a semiconductor switch or active clamping switch designed to actively confine or to actively delimit the voltage load of the synchronous rectification switch Q2.

As will be explained in more detail below, a single control circuit generates the driver signals to turn-on and to turn-off all four transistors Q1, Q2, Q3, Q4 of the flyback converter. In this context, it will be appreciated by a man skilled in the art that only the flyback power converter is addressed because such addressing is the most cost-effective circuit topology being a key feature for the dominant range of applications.

The so-called power transformer Tr1 in the flyback converter is practically a coupled inductor; that, and some other functions, is the reason why the flyback converter does not have the disadvantages of switched mode power supplies derived from the forward-based converter topology; the disadvantages of forward-based topologies is the key objective of U.S. Pat. No. 6,888,728 B2 to effectively prevent the generation of through currents in the two series connected synchronous rectifier switches.

Contrary thereto, the circuit arrangement 100 according to the present invention has a significant lower effort to generate drive signals for the synchronous rectifier switches being realized by the second transistor Q2 as well as by the fourth transistor Q4. These are practically the gate drive transformer Tr2 (with at least one preconnected driver IC4) and the optocoupler IC5 on the secondary side of the transformer Tr1.

It will be appreciated by a man skilled in the art that neither any timing circuit nor any comparator orr any amplifier is required on the secondary side of the flyback converter; all required timing and logic functions are on the primary side of the flyback converter where they can be integrated in one single control I[ntegrated]C[ircuit].

A voltage sensor VS is implemented as a comparator for measuring the voltage drop of the first transistor Q1. The voltage sensor VS generates a logic output signal $V_{f1}$
- being "1" if the voltage sensor VS measures a negative drain-source voltage of the first transistor Q1, and
- being "0" if the voltage sensor VS measures a vanishing or positive drain-source voltage of the first transistor Q1.

In this way, the voltage sensor VS can detect a negative drain-source current at the first transistor Q1. A negative current $I_1(t)$ (cf. FIG. 2) is present at least in the time interval from t3 to t5 (cf. FIG. 2) because of the active clamping principle.

Assigned to said voltage sensor unit VS, FIG. 1 depicts a first integrated circuit IC1, namely a high voltage driver for power metal-oxide semiconductor field effect transistor (MOSFET) or insulated gate bipolar transistor (IGBT) driver with independent high and low side referenced output channels; the proprietary high voltage insulator coating (HVIC) technology as well as the latch immune complementary metal oxide semiconductor (CMOS) technology enable a ruggedized monolithic construction of said first integrated circuit IC1.

The logic output signal $V_{f1}$ from the voltage sensor VS as well as the delayed time signal $V_{PWM.Q2}$ are the two input signals of a logic unit L5, said logic unit L5 comprising an OR function. The difference of the output signal of this OR function minus the output signal of a third integrated circuit IC3 providing a positive quadruple 2-input AND function (=the difference between the voltage of the output signal of the logic unit L5 and the voltage of the output signal of the third integrated circuit IC3) is the signal $V_{GS.Q2}$ (cf. FIG. 2) being the drive signal to turn-on and to turn-off the second transistor Q2.

In other words, the voltage sensor VS can measure the voltage drop across the low side switch Q1 on the primary side which will give a digital "high" output ($V_{f1}$="1") if the sensed drain-source voltage of the low side switch Q1 is negative due to the fact that the current in the low side switch Q1 is flowing from the source of the low side switch Q1 to the drain of the low side switch Q1.

This digital output $V_{f1}$ of the voltage sensor VS is ORed with a second signal to drive the synchronous rectifier switch Q2 wherein this second signal is a delayed signal of the inverse P[ulse-]W[idth]M[odulation] signal; the inverse P[ulse-]W[idth]M[odulation] signal is generated by an inverse P[ulse-]W[idth]M[odulation] unit PWMi being a component of a second integrated circuit IC2, namely of a monolithic timing circuit.

Accordingly, it is a further advantage of the converter circuit 100 according to the present invention that a shunt resistor is not required to generate the timing signals of the synchronous rectifier switches Q2, Q4. Instead, the negative drain-source voltage of the first transistor Q1 is additionally monitored with the voltage sensor to finally determine the on-time of rectifier switch Q2.

As can be further taken from FIG. 1, a sixth integrated circuit IC6, namely a three-terminal programmable shunt regulator diode is arranged at the output stage of the circuit arrangement 100. This monolithic IC6 voltage reference operates as a low temperature coefficient zener diode being programmable from reference voltage to 36 Volt with at least one external resistor, preferably with two external resistors.

Close to said sixth integrated circuit IC6, a seventh integrated circuit IC7 comprising an optocoupler is arranged behind an eighth integrated circuit IC8.

Figure 2:
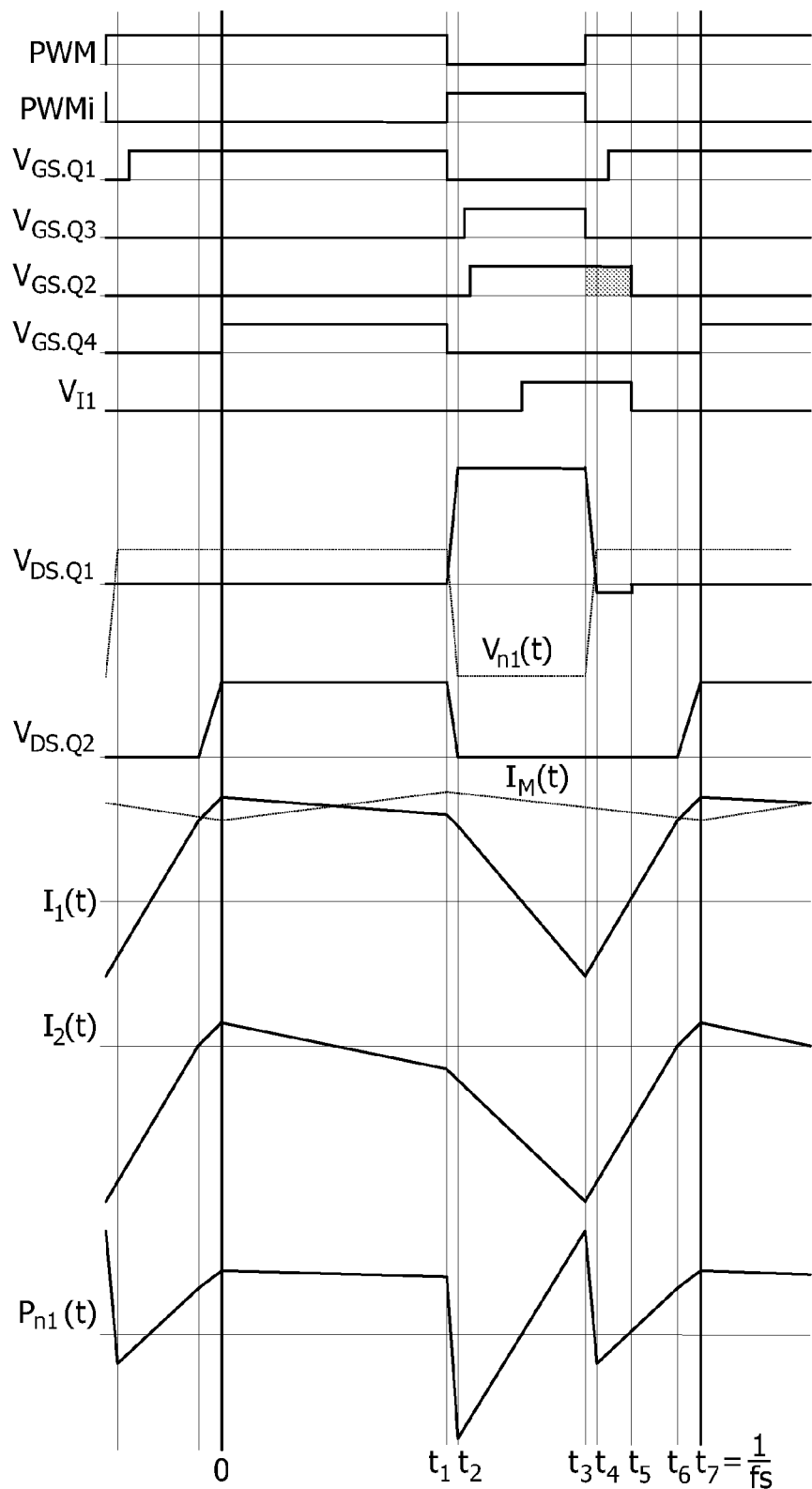
FIG. 2 schematically shows a principle diagram of qualitative time functions in steady state, referring to the method of the present invention.

With reference to FIG. 2, the second transistor Q2 works as synchronous rectification switch which is turned-off at time point t3 with the falling edge of the output signal of the inverse P[ulse-]W[idth]M[odulation] unit PWMi. At this time point t3, the third transistor Q3 is also turned-off, and the changing voltage $V_{DS,Q1}$ (cf. FIG. 2) changes the slope of the current in the second transistor Q2, with said changing voltage $V_{DS,Q1}$ becoming slightly negative between in the time interval from t4 to t5 (cf. FIG. 2) because of the active clamping principle.

The second transistor Q2 is turned-off with a variable delay time. The delay time interval is a function of the relative converter power level. A minimum delay time is adjusted with the second resistor R2 in a time delay circuit TDC in FIG. 1. This time delay is in the order of some percentage of the time period t7=1/fs (cf. FIG. 2) wherein fs is the switching frequency. This time delay is independent from the power level.

Assigned to said time delay circuit TDC, FIG. 1 depicts the monolithic timing circuit IC2
- providing full compatibility with complementary metal oxide semiconductor (CMOS), transistor-transistor logic (TTL), and metal oxide semiconductor (MOS) logic and
- operating at frequencies up to two Megahertz.

The respective third integrated circuit IC3 providing positive quadruple 2-input AND function is arranged
- between the first integrated circuit IC1 and the time delay circuit TDC as well as
- behind the time delay circuit TDC.

The outputs of this positive quadruple 2-input AND function are fully buffered for highest noise immunity and for pattern insensitivity of output impedance.

The above-identified control technique does not prevent a conduction of the inverse diode of the second transistor Q2 for example from time point t5 to time point t6 in FIG. 2. However, it has been found from measurements that such conduction of the inverse diode of the second transistor Q2 does not influence the power losses of the flyback converter if the relative power level is between zero percent and ninety percent.

Only for power levels between ninety percent and hundred percent, a further reduction of losses in the second transistor Q2 can be achieved. However, this requires a much higher component effort as given in documents EP 1 148 624 A1, U.S. Pat. No. 6,462,965 B1, or US 2003/0090914 A1.

All in all, a special control technique generates the drive signal of the synchronous rectifier power semiconductor to be used in the actively clamped bidirectional flyback converter according to the present invention. This control technique requires a minimum effort to sense electrical signals.

In the claims, the first power semiconductor (Q1) may in particular be at least one first transistor unit, for example at least one first metal-oxide semiconductor (MOS) or at least one first metal-oxide semiconductor field effect transistor (MOSFET). The second power semiconductor (Q2) may in particular be at least one second transistor unit, for example at least one second metal-oxide semiconductor (MOS) or at least one second metal-oxide semiconductor field effect transistor (MOSFET). The third power semiconductor (Q3) may in particular be at least one third transistor unit, for example at least one third metal-oxide semiconductor (MOS) or at least one third metal-oxide semiconductor field effect transistor (MOSFET). The fourth power semiconductor (Q4) may in particular be at least one fourth transistor unit, for example at least one fourth metal-oxide semiconductor (MOS) or at least one fourth metal-oxide semiconductor field effect transistor (MOSFET). The transformer unit (Tr1) may in particular be at least one power transformer. The drive signal for the synchronous rectification switch may be generated as a function of at least one oscillating signal controlling the synchronous rectification switch, of at least one constant delay time, of at least one variable delay time, in particular of the detection of the current I1(t) in the primary winding of the transformer unit (Tr1) generating the variable delay time, and of at least one Boolean OR function, in particular provided by at least one logic unit (L5). The first integrated circuit (IC1) may in particular be at least one high voltage driver of power metal-oxide semiconductor field effect transistor (MOSFET) or insulated gate bipolar transistor (IGBT) driver. The second integrated circuit (IC2) may in particular be at least one timing circuit, for example at least one monolithic timing circuit. The fourth integrated circuit (IC4) may in particular be at least one diode or driver, for example by at least one rectification diode. The fifth integrated circuit (IC5) may in particular be at least one optocoupler unit. The sixth integrated circuit (IC6) may in particular be at least one programmable shunt regulator diode, for example at least one three-terminal programmable shunt regulator diode. The seventh integrated circuit (IC7) may in particular be at least one optocoupler.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

List of Reference Signs

100 circuit arrangement comprising actively clamped bidirectional flyback converter IC1 first integrated circuit, in particular high voltage driver of power metal-oxide semiconductor field effect transistor (MOSFET) or insulated gate bipolar transistor (IGBT) driver with independent high and low side referenced output channels IC2 second integrated circuit, in particular timing circuit, for example monolithic timing circuit IC3 third integrated circuit, in particular providing positive quadruple 2-input AND function IC4 fourth integrated circuit, in particular diode or driver, for example rectification diode IC5 fifth integrated circuit, in particular optocoupler IC6 sixth integrated circuit, in particular programmable shunt regulator diode, for example three-terminal programmable shunt regulator diode IC7 seventh integrated circuit, in particular optocoupler or optocoupling unit IC8 eighth integrated circuit $I_1(t)$ first current $I_2(t)$ second current L1 first logic unit, in particular comprising AND function L2 second logic unit, in particular comprising AND function L3 third logic unit, in particular comprising AND function
L4 fourth logic unit, in particular comprising AND function
L5 fifth logic unit, in particular comprising OR function
OS oscillator unit
PWM P[ulse-]W[idth]M[odulation] unit
PWMi inverse P[ulse-]W[idth]M[odulation] unit
Q1 first power semiconductor, in particular first transistor unit, for example first metal-oxide semiconductor (MOS) or first metal-oxide semiconductor field effect transistor (MOSFET), of flyback converter
Q2 second power semiconductor, in particular second transistor unit, for example second metal-oxide semiconductor (MOS) or second metal-oxide semiconductor field effect transistor (MOSFET), of flyback converter
Q3 third power semiconductor, in particular third transistor unit, for example third metal-oxide semiconductor (MOS) or third metal-oxide semiconductor field effect transistor (MOSFET), of flyback converter
Q4 fourth power semiconductor, in particular fourth transistor unit, for example fourth metal-oxide semiconductor (MOS) or fourth metal-oxide semiconductor field effect transistor (MOSFET), of flyback converter
R1 first resistor unit
R2 second resistor unit
TDC time delay circuit
Tr1 first transformer unit, in particular power transformer
Tr2 second transformer unit, in particular gate drive transformer
$V_{dd}$ supply voltage
$V_{DS.Q1}$ changing voltage changing slope of current in second power semiconductor Q2
$V_{GS.Q2}$ output signal of fifth logic unit L5
$V_{J1}$ output signal, in particular logic output signal, of voltage sensor unit VS
VIB voltage isolation barrier
$V_{in}$ input voltage
$V_{out}$ output voltage
$V_{PWM.Q2}$ delayed time signal
VS voltage sensor unit, in particular comparator unit

The invention claimed is:

1. A circuit arrangement comprising at least one actively clamped bidirectional flyback converter, comprising:
   a transformer unit comprising a primary side and a secondary side;
   a first power semiconductor disposed on said transformer unit primary side;
   a second power semiconductor disposed on said transformer unit secondary side;
   a third power semiconductor disposed on said transformer unit primary side;
   a fourth power semiconductor disposed on said transformer unit secondary side; and
   a timing circuit disposed on said transformer unit primary side;
   wherein
   said second power semiconductor comprises a synchronous rectification switch, and
   a drive signal for said synchronous rectification switch is generated as a function of an oscillating signal controlling said synchronous rectification switch.

2. The circuit arrangement according to claim 1, further comprising a voltage sensor unit configured to measure a voltage drop across said first power semiconductor.

3. The circuit arrangement according to claim 2, wherein said voltage sensor unit generates at least one logic output signal
   being "1" or "high" if said voltage sensor unit measures a negative drain-source voltage of said first power semiconductor, and
   being "0" or "low" if said voltage sensor unit measures a vanishing or positive drain-source voltage of said first power semiconductor.

4. The circuit arrangement according to claim 3, further comprising
   a logic unit comprising:
   a first input signal comprising a logic output signal from said voltage sensor unit;
   a second input signal comprising at least one delayed time signal; and
   an output signal comprising a drive signal to turn-on and to turn-off said second power semiconductor.

5. The circuit arrangement according to claim 1, wherein said second power semiconductor is turned-on and/or turned-off with at least one variable delay time, with the delay time interval being a function of the relative power level of the flyback converter.

6. The circuit arrangement according to claim 5, wherein a minimum delay time is adjusted with at least one resistor unit in at least one time delay circuit, said delay time comprising a percentage of a time period, wherein said time period is the inverse of a switching frequency.

7. The circuit arrangement according to claim 1, further comprising:
   a first integrated circuit assigned to said voltage sensor unit;
   a second integrated circuit assigned to said time delay circuit;
   a third integrated circuit for providing positive quadruple 2-input AND function, said third integrated circuit being arranged between said first integrated circuit and said time delay circuit as well as behind said time delay circuit;
   a fourth integrated circuit arranged behind said third integrated circuit;
   a fifth integrated circuit arranged on the secondary side of the transformer unit;
   a sixth integrated circuit arranged at the output stage of the circuit arrangement; and/or
   a seventh integrated circuit arranged behind at least one eighth integrated circuit.

8. A method for generating at least one drive signal for at least one synchronous rectification switch of at least one actively clamped bidirectional flyback converter, wherein said at least one actively clamped bidirectional flyback converter comprises a primary side and a secondary side, and said at least one synchronous rectification switch is arranged on said secondary side and a timing circuit is arranged on said primary side,
   wherein a drive signal for said synchronous rectification switch is generated as a function of at least one oscillating signal controlling said synchronous rectification switch.

9. The method according to claim 7, wherein at least part of said at least one actively clamped bidirectional flyback converter is turned-on and/or turned-off with at least one variable delay time, with the delay time interval being a function of the relative power level of said at least one actively clamped bidirectional flyback converter.

* * * * *